United States Patent
Zheng et al.

(10) Patent No.: US 11,979,361 B2
(45) Date of Patent: May 7, 2024

(54) DIALOGUE ROBOT GENERATION METHOD, DIALOGUE ROBOT MANAGEMENT PLATFORM, AND STORAGE MEDIUM

(71) Applicant: JINGDONG TECHNOLOGY HOLDING CO., LTD., Beijing (CN)

(72) Inventors: Yuyu Zheng, Beijing (CN); Songxiang Gu, Beijing (CN); Jun Wang, Beijing (CN); Yu Zhang, Beijing (CN)

(73) Assignee: JINGDONG TECHNOLOGY HOLDING CO., LTD., Beijing (CN)

( * ) Notice: Subject to any disclaimer, the term of this patent is extended or adjusted under 35 U.S.C. 154(b) by 23 days.

(21) Appl. No.: 17/753,802

(22) PCT Filed: Apr. 13, 2020

(86) PCT No.: PCT/CN2020/084515
§ 371 (c)(1),
(2) Date: Mar. 15, 2022

(87) PCT Pub. No.: WO2021/051792
PCT Pub. Date: Mar. 25, 2021

(65) Prior Publication Data
US 2022/0345424 A1    Oct. 27, 2022

(30) Foreign Application Priority Data
Sep. 16, 2019    (CN) .......................... 201910872289.9

(51) Int. Cl.
*H04L 51/02* (2022.01)
*G06F 16/332* (2019.01)

(52) U.S. Cl.
CPC .......... *H04L 51/02* (2013.01); *G06F 16/3329* (2019.01)

(58) Field of Classification Search
CPC ... H04L 51/02; G06F 16/3329; G06F 16/335; G06F 16/337; G06F 16/9535
See application file for complete search history.

(56) References Cited

U.S. PATENT DOCUMENTS

2005/0228668 A1    10/2005    Wilson
2013/0238333 A1    9/2013    William et al.
(Continued)

FOREIGN PATENT DOCUMENTS

CN    106790598 A    5/2017
CN    107133349 A    9/2017
(Continued)

OTHER PUBLICATIONS

First Office Action of the Japanese application No. 2022-542303, dated Mar. 6, 2023, 5 pages.
(Continued)

*Primary Examiner* — Soe Hlaing
(74) *Attorney, Agent, or Firm* — Finch & Maloney PLLC (57) ABSTRACT

A dialogue robot generation method, a dialogue robot management platform, and a storage medium. The dialogue robot generation method comprises: obtaining at least one first function module associated with a dialogue robot to be generated (101); obtaining a calling sequence of the at least one first function module (102); and calling the at least one first function module on the basis of the calling sequence by means of a preset model container to generate a dialogue robot (103).

17 Claims, 6 Drawing Sheets

(56) References Cited

U.S. PATENT DOCUMENTS

2019/0124020 A1* 4/2019 Bobbarjung ............ H04L 51/02
2019/0197181 A1   6/2019 Li et al.
2020/0387550 A1* 12/2020 Cappetta ................. H04L 51/02

FOREIGN PATENT DOCUMENTS

| CN | 107765571 A | 3/2018 |
| --- | --- | --- |
| CN | 108737324 A | 11/2018 |
| CN | 109002510 A | 12/2018 |
| CN | 109359147 A | 2/2019 |
| CN | 109408800 A | 3/2019 |
| CN | 109597607 A | 4/2019 |
| CN | 110597972 A | 12/2019 |

OTHER PUBLICATIONS

International Search Report in the international application No. PCT/CN2020/084515, dated Jul. 1, 2020.

English translation of the Written Opinion of the International Search Authority in the international application No. PCT/CN2020/084515, dated Jul. 1, 2020.

Qi, Yubi, Design and Implementation of Task-Oriented Dialogue System Development Platform, China's outstanding master's degree in theory full text database (master) information book of science and technology, Aug. 15, 2019.

Yosuke Matsusaka et al, An extensible dialogue script for a robot based on unification of state transition models, IEEE Xplore, Mar. 1, 2010.

* cited by examiner

DIALOGUE ROBOT GENERATION METHOD, DIALOGUE ROBOT MANAGEMENT PLATFORM, AND STORAGE MEDIUM

CROSS-REFERENCE TO RELATED APPLICATION

The present application is based on and claims priority of Chinese Patent Application No. 201910872289.9, filed on Sep. 16, 2019, the content of which is hereby incorporated by reference in its entirety.

TECHNICAL FIELD

The present disclosure relates to, but is not limited to, the field of computer technology, and in particular, to a method for generating a chatbot, a platform for managing a chatbot, and storage medium.

BACKGROUND

At present, in a vertical industry, the market demands for chatbots have common aspects and also have different aspects. At present, there is no industry-level system architecture, which can quickly generate chatbots that meet personalized requirements of different business parties in a short time in a certain vertical industry.

SUMMARY

Embodiments of the present disclosure provide a method for generating a chatbot, a platform for managing a chatbot, and storage medium so as to solve the problem that in a related art, a chatbot that meets the personalized requirements of different business parties cannot be quickly generated in a short time, and so as to generate a personalized chatbot quickly.

The technical solutions of the embodiments of the present disclosure are implemented as follows.

There is provided a dialogue robot generation method, including:
  obtaining at least one first function module associated with a chatbot to be generated:
  obtaining a calling order of the at least one first function module;
  generating the chatbot by calling the at least one first function module based on the calling order through a preset model container.

Optionally, obtaining the at least one first function module associated with the chatbot to be generated includes:
  obtaining at least one piece of first dialogue logic information associated with the chatbot to be generated; and
  determining the at least one first function module associated with the at least one piece of first dialogue logic information.

Optionally, determining the at least one first function module associated with the at least one piece of first dialogue logic information includes:
  obtaining attribute information of all first function modules in a preset first function module set, wherein the attribute information includes at least description information of a function of the first function modules;
  selecting at least one piece of target attribute information matching the at least one piece of first dialogue logic information from the attribute information of the all first function modules; and
  selecting the at least one first function module having the at least one piece of target attribute information from the preset first function module set.

Optionally selecting the at least one first function module having the at least one piece of target attribute information from the preset first function module set includes:
  selecting at least one second function module having the at least one piece of target attribute information from the preset first function module set;
  obtaining service processing logic of each second function module of the at least one second function module; and
  determining the at least one first function module from the at least one second function module based on the at least one piece of first dialogue logic information and the at least one service processing logic.

Optionally, after generating the chatbot by calling the at least one first function module based on the calling order through the preset model container, the method further includes:
  obtaining dialogue interaction information input by a user; and
  generating response information for the dialogue interaction information by the chatbot.

Optionally, generating the response information for the dialogue interaction information by the chatbot includes:
  setting service processing, functions corresponding to the all first function modules in the preset first function module set; and
  generating the response information for the dialogue interaction information by the chatbot calling the service processing functions.

Optionally, the method further includes:
  obtaining the dialogue interaction information, the response information, and interaction time associated with the dialogue interaction information; and
  storing the dialog interaction information, the response information, and the interaction time into a preset storage area based on a preset data storage structure.

Optionally, the method further includes:
  receiving at least one piece of second dialogue logic information input by the user for the chatbot;
  updating the at least one first function module based on the at least one piece of first dialogue logic information the at least one piece of second dialogue logic information, and content stored in the storage area, to obtain at least or a third function module; and
  updating the robot based on the at least one third function module through the preset model container.

There is provided a platform for managing a chatbot, including:
  a memory for storing executable instructions;
  a processor for executing the executable instructions stored in the memory to implement the method for generating a chatbot as described above.

There is provided a storage medium having stored thereon executable instructions that when executed, cause a processor to perform the method for generating a chatbot as described above.

The embodiments of the present disclosure are applied for achieving the following advantageous effects: a personalized chatbot is generated quickly, a new robot is provided with a data service by using basic data of other robots in the platform for managing a chatbot, and maintenance is simplified at a later stage. All maintenance may be made by configuring and editing processing logic and basic data in the platform for managing a chatbot through the platform a third-party platform) for managing chatbot without affecting the operation of the platform for managing a chatbot. Meanwhile, it is achieved that the dialogue logic is configurable, different first-level service processing logics are set according to different service robots, and a corresponding first function module is called according to a corresponding logic order to perform service processing. It is achieved that different personalized robots are quickly generated and a bottom module is reused. A configurable model container is achieved. The model container uniformly loads all first function modules. All engineering processes call the model through the model container. A function extension and a later function maintenance control the first function module through the model container. It is achieved that the data sharing is thoroughly perfumed from the bottom layer data and function modules, and the function reuse, flexible configuration, and easy maintenance are realized, so that the cost is reduced, the copying is fast and new personalized chatbots are generated in batches.

At least one first function module associated with a chatbot to be generated is obtained, a calling order of the at least one first function module is obtained, and the chatbot is generated by calling the at least one first function module based on the calling order through a preset model container, such that the problem in the related art that the chatbot that meets the personalized requirements of different business parties cannot be quickly generated in a short time is solved, thereby generating a personalized chatbot quickly.

DETAILED DESCRIPTION

In order to make the purposes, technical solutions, and advantages of the present disclosure clearer, the present disclosure will be described in further detail below with reference to the accompanying drawings. The described embodiments shall not be regarded as limiting the present disclosure, and all other embodiments obtained by those skilled in the art without creative effort shall fall within the scope of the present disclosure.

Unless otherwise defined, all technical and scientific terms used herein have the same meanings as those skilled in the art of the present disclosure generally understand. The terms used herein are for the purpose of describing embodiments of the present disclosure only and are not intended to limit the present disclosure.

Prior to further detailed description of the embodiments of this application, nouns and terms related to the embodiments of this application will be described. The nouns and terms related to the embodiments of this application are applicable to the following explanation.

1) Nature Language Understanding (NLU) has a rich research content, including Chinese automatic word segmentation, part-of-speech tagging, syntax analysis, natural language generation, text classification, information retrieval, information extraction, text proofreading, question answering system, machine translation, automatic abstract and textual entailment. The NLU converts the identified text information into a semantic representation that the machine can understand.

2) Dialogue Management (DM) can immediately be the brain of the dialog system, and can perform the following operations: on the one hand, maintaining and updating a dialogue state; on the other hand, selecting a next appropriate action based on a current dialogue state. Herein, the dialogue state is a data representation that can be processed by a machine and contains all the information that may affect a next decision, such as an output of the NLU, user characteristics, etc.

3) Nature Language Generation (NLG) is a branch of artificial intelligence and computational linguistics. The corresponding language generation system is a computer model based on language information processing. Contrary to natural language analysis, the working process of the corresponding language generation system starts from an abstract conceptual level and generates text by selecting and executing certain semantics and syntax rules.

4) A chatbot, also known as a dialogue robot, is a platform integrating multiple technologies.

In the related art, the current architecture of the dialogue robot (i.e., the chatbot) in the industry is more focused on enriching and optimizing functional points of a single chatbot, such as improving classification accuracy and semantic understanding. Chatbots in the industry for a user group at present are mostly targeted at a certain application pain point and are made for the mass consumers. Most of chatbots in the vertical field are simple in function, which can simply rely on matching of editing distances and respond according to matched sentences.

At present, in the vertical industry, the demands for chatbots have common aspects and also have different aspects. At present, there is no industry-level system architecture, which may quickly generate chatbots that meets personalized requirements of different business parties in a short time in a certain vertical industry. At present, in the industry, it tends to make different chatbots for different clients through either copying the whole project or reusing partial module. The resulting drawbacks include high development costs, a impossibility of rapid replication and both generation of new personalized chatbots.

Figure 1:
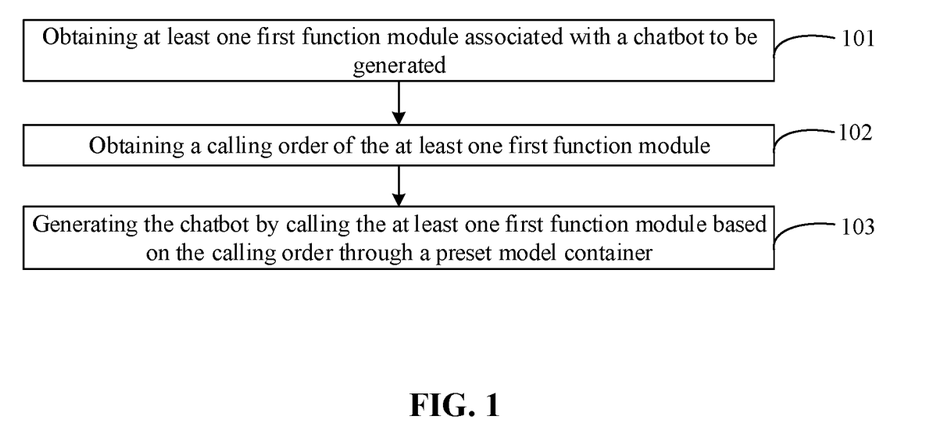
FIG. 1 is a flow chart of a method for generating a chatbot according to an embodiment of the present disclosure.

Based on the foregoing, an embodiment of the present disclosure provides a method for generating a chatbot applied to a platform for managing a chatbot. Referring to FIG. 1, the method includes the following operations.

In operation 101, at least one first function module associated with a chatbot to be generated is obtained.

In an embodiment of the present disclosure, the at least one first function module associated with different chatbots to be generated may be completely different, or the at least one first function module associated with different chatbots to be generated may be partially the same.

In an embodiment of the present disclosure, the partitioning of the function modules is defined according to the functions. Any module having the same function, different parameters, and different read data sources is defined as one function module. Calling of different functions with differences are implemented by different parameters. In an embodiment of the present disclosure, the module is defined according to a principle of simplicity. For example, the elastic search retrieval module has only two modules, i.e., a precise module query and a fuzzy query. The remaining remote connection elastic search, local connection elastic search and various queries implemented by using elastic search are implemented in these two modules. Different function requirements are satisfied through different input parameters.

In an embodiment of the present disclosure, the at least one first function module corresponds to a first-level service processing logic. For different chatbots to be generated, different first-level service processing logic may be set.

In operation 102, a calling order of the at least one first function module is obtained.

In an embodiment of the present disclosure, the calling order may be understood as a logic order, that is, an order in which the function modules are called.

In an actual application, after obtaining the at least one first function module associated with the chatbot to be generated, the platform for managing a chatbot further obtains the calling order of the at least one first function module. Here, the calling order of the at least one first function module embodies different service logics.

In operation 103, the chatbot is generated by calling the at least one first function module based on the calling order through a preset model container.

In an embodiment of the present disclosure, the platform for managing a chatbot generates the chatbot by calling the at least one first function module based on the calling order though the preset model container. It is to be noted that, by calling the at least one first function module based on different calling orders through the preset model container, the platform for managing a chatbot generates different chatbots. Of course, by calling different first function modules based on the calling order through the preset model container, the platform for managing a chatbot generates different chatbots. That is, at least one of the calling order and the called first function module is different, and the resulting chatbot is different. In this way, different chatbots are generated for different customers, which reduces development costs and realizes personalization of the chatbots.

The method for generating a chatbot provided in an embodiment present disclosure obtains at least one first function module associated with a chatbot to be generated; obtains a calling order of the at least one first function module: generates the chatbot by calling the at least one first function module based on the calling order through a preset model container. The method solves the problem that in the related art, a chatbot that meets the personalized requirements of different business parties cannot be quickly generated in a short time is solved, thereby generating a personalized chatbot quickly.

According to the foregoing embodiment, an embodiment of the present disclosure provides a method for generating a chatbot applied to a platform for managing a chatbot. Retelling to FIG. 2 the method the following operations.

Figure 2:
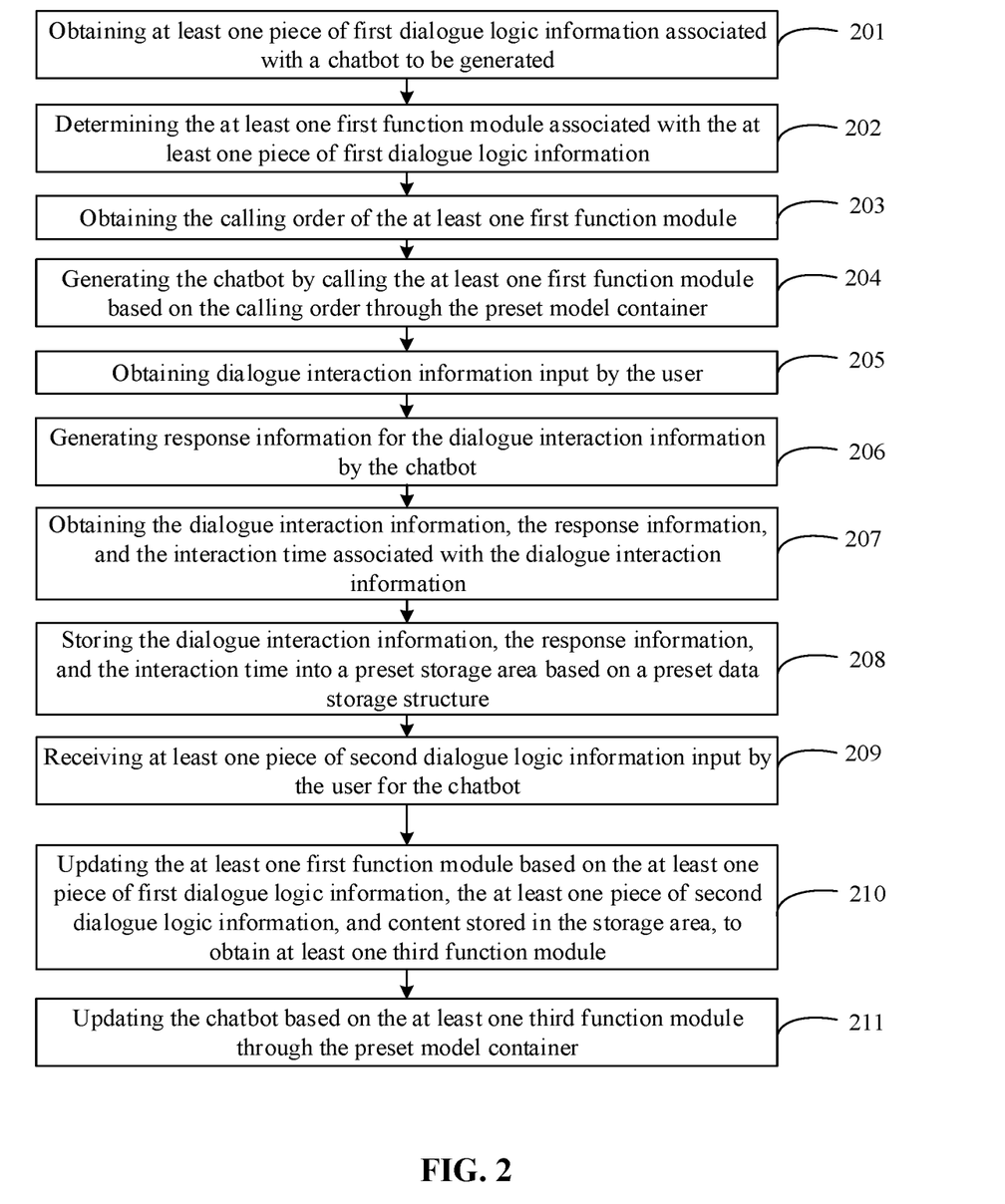
FIG. 2 is a flow chart of another method for generating a chatbot according to an embodiment of the present disclosure.

In operation 201, at least one piece of first dialogue logic information associated with a chatbot to be generated is obtained.

In an embodiment of the present disclosure, the at least one piece of first dialogue logic information represents a requirement of a user for personalized chat of the chatbot to be generated.

In an embodiment of the present disclosure, a preset model container is obtained by setting a model container. A name of the preset model container is set as model Manager. The preset model container uniformly loads all function modules, and realizes a unified management of all modules. The modules are visualized on the management platform. Different chatbots call or discard some module functions through the preset model container according to their respective processing logics.

In an embodiment of the present disclosure, the dialogue logic information is used to provide complete, clear and specific requirements for the chatbot to be generated, and to determine tasks to be performed by the chatbot to be generated. The dialogue logic information may be information obtained by translating the non-formal requirements of the user into a complete requirement definition, after a developer has accurately understood the function, performance and reliability of the user and a project through a thorough investigation and analysis. Based on the dialogue logic information, the platform for managing a chatbot may determine operations the chatbot to be generated needs to perform.

As will be appreciated from the foregoing descriptions, a logic processing container response Units is further provided in an embodiment of the present disclosure, which stores service logic processing orders of different robots. In this way, different personalized robots are only different at this point, thereby implementing different business logics.

In operation 202, the at least one first function module associated with the at least one piece of first dialogue logic information is determined.

In an embodiment of the present disclosure, the operation 202 of determining the at least one first function module associated with the at least one first dialogue logic information includes the following operations.

In operation 202a, attribute information of all first function modules in a preset first function module set is obtained.

The attribute information includes at least description information of a function of the first function module.

Figure 3:
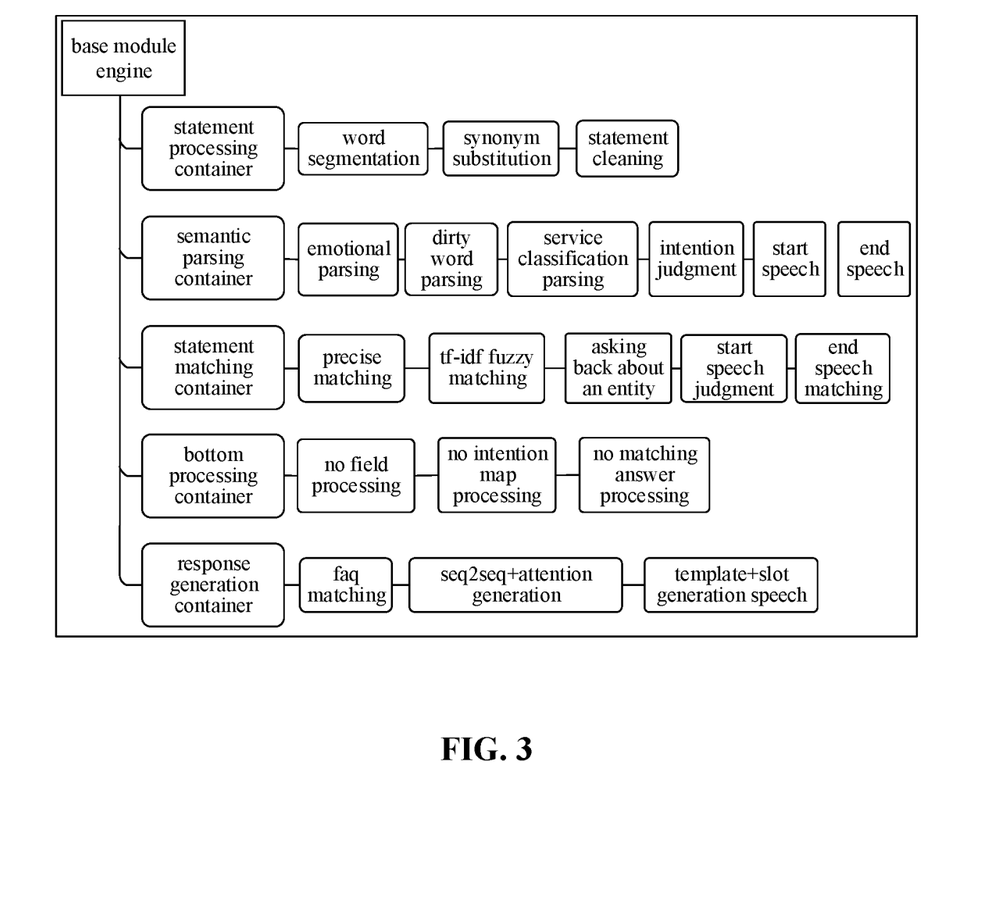
FIG. 3 is a schematic architectural diagram of a chatbot according to an embodiment of the present disclosure.

In an embodiment of the present disclosure, referring to FIG. 3, the preset first function module set includes, but is not limited to, a statement processing container, a semantic parsing container, a statement matching container, a bottom processing container, and a response generation container. Further, the attribute information corresponding to the statement processing container includes, but is not limited to, word segmentation, synonym substitution, and statement cleaning. The attribute information corresponding to the semantic parsing container includes, but is not limited to, an emotional parsing, a dirty word parsing, a service classification parsing, an intention judgment, a start speech, and an end speech. The attribute information corresponding to the statement matching container includes, but is not limited to, precise matching, tf-idf fuzzy matching, asking back about an entity, start speech judgment, and end speech matching. The attribute information corresponding to the bottom processing container includes, but is not limited to, no field processing, no intention map processing, and no matching answer processing. The attribute information corresponding to the response generation container includes, but is not limited to, faq matching, seq2seq+attention generation, and template+slot generation speech.

In an embodiment of the present disclosure, referring to FIG. 3, the platform for managing a chatbot may obtain the attribute information of the all first function modules in the preset first function module set through loading a base module engine.

In operation 202b, at least one piece of target attribute information matching the at least one piece of first dialogue logic information is selected from the attribute information of the all first function modules.

In operation 202c, the at least one first function module having the at least one piece of target attribute information is selected from the preset first function module set.

In an embodiment of the present disclosure, the operation 202c of selecting the at least one first function module having the at least one piece of target attribute information from a preset first function module set includes the following operations.

Firstly at least one second function module having the at least one piece of target attribute information is selected from the preset first function module set.

Secondly, service processing logic of each second function module of the at least one second function module is obtained.

Finally, the at least one first function module is determined from the at least one second function module based on the at least one piece of first dialogue logic information and the at least one service processing logic.

Figure 4:
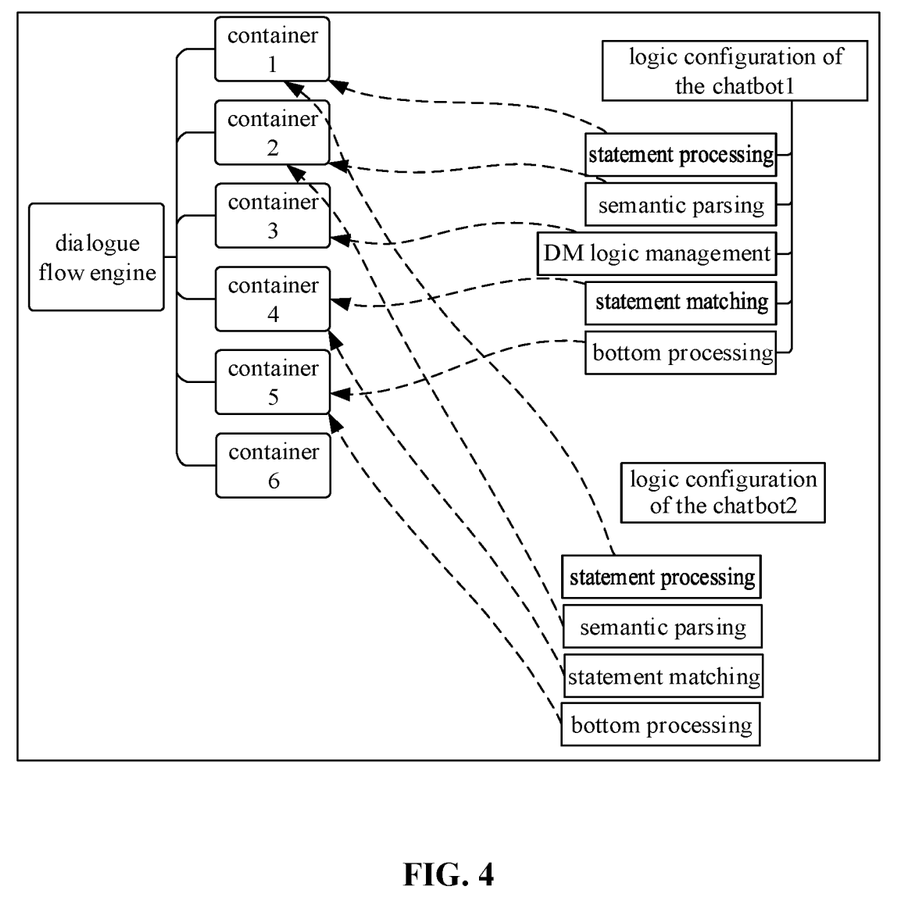
FIG. 4 is a schematic architectural diagram of another chatbot according to an embodiment of the present disclosure.

For example, taking a generation of two different chatbots as an example, referring to FIG. 4, there are a first chatbot chatbot1 to be generated and a second chatbot chatbot2 to be generated For the chatbot1, after obtaining at least one piece of first dialogue logic information associated with the chatbot1 from a dialogue flow engine, the platform for managing a chatbot obtains at least one service processing logic, namely, a logic configuration of the chatbot1, and then smoothly calls a corresponding function module according to the corresponding logic to perform service processing. Referring to FIG. 4, for example, based on the at least one piece of first dialogue logic information associated with the chatbot1, it is determined that five modules are required to perform the service processing, which include calling statement processing, semantic parsing, DM logic management, statement matching, and bottom processing. For the chatbot2, after obtaining at least one piece of first dialogue logic information associated with the chatbot2 from the dialogue flow engine, the platform for managing a chatbot obtains at least one service processing logic, namely, a logic configuration of the chatbot2, and then smoothly calls a corresponding function module according to the corresponding logic to perform service processing. Referring to FIG. 4, for example, based on the at least one piece of first dialogue logic information associated with the chatbot2, it is determined that four modules are required to perform the service processing, which include calling statement processing, semantic parsing, statement matching, and bottom processing Different chatbots obtain different flow logics from the dialogue flow engine to implement differentiated requirements of different chatbots.

In operation 203, the calling order of the at least one first function module is obtained.

In operation 204, the chatbot is generated by calling the at least one first function module based on the calling order through the preset model container.

In operation 205, dialogue interaction information input by the user is obtained.

In operation 206, response information for the dialogue interaction information is generated by the chatbot.

In a an embodiment of the present disclosure, for the dialogue flow processing engine, the flow process may be divided into two levels of process. The platform for managing a chatbot sets different first-level service processing logic according to different service robots, and calls a corresponding function module to perform the service processing according to a corresponding logic order processing.

Figure 5:
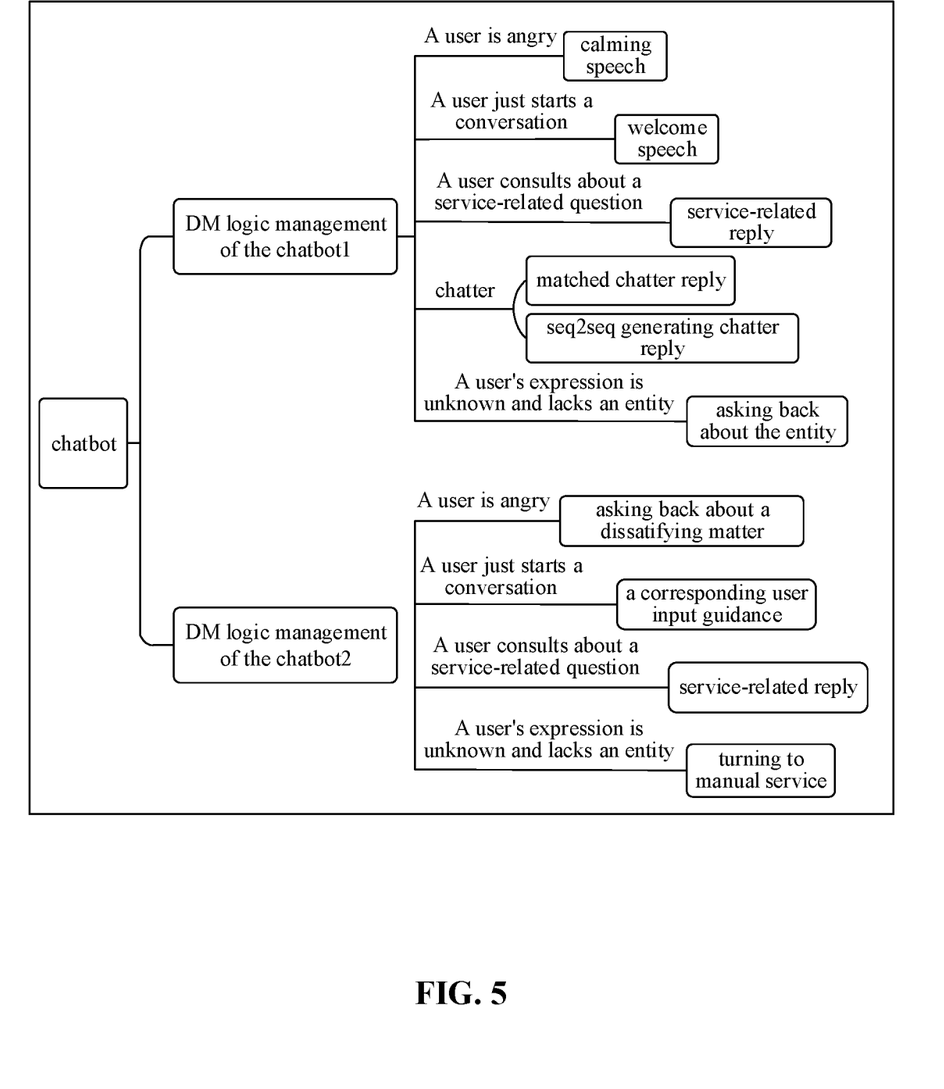
FIG. 5 is a schematic architectural diagram of still another chatbot according to an embodiment of the present disclosure.

In an embodiment of the present disclosure, for the dialogue flow processing engine, a second-level service processing logic is embodied in each sub-module in respond units, and may set a service logic to realize personalized requirements. As shown in FIG. 5, fin example, the DM logic management is set differently according to different chatbots. For example, for the DM logic management of the chatbot1 the user is angry corresponds to a calming speech, the user just starts a conversation corresponds to welcome speech, the user consults about a service-related question corresponds to a service-related reply, a chatter corresponds to a matched chatter reply or a seq2seq-generated chatter reply, and the user's expression is unknown and lacks an entity corresponds to the asking back about the entity. For the DM logic management of the chatbot2, the user is angry corresponds to asking back about a dissatisfying matter, the user starts speech corresponds to and a corresponding user input guidance, the user consults about a service-related question corresponds to a service-related reply, and the user's expression is unknown and lacks an entity corresponds to turning to manual service.

In an embodiment of the present disclosure, the operation 206 of generating the response information for the dialogue interaction information by the chatbot includes the following operations.

In operation 206a, service processing functions corresponding to the all first function modules in the preset first function module set are set.

In an embodiment of the present disclosure, one service processing function is set for the all first function modules, the parameters are unified, and the forms are unified, and the forms can be replaced with each other.

In an embodiment of the present disclosure, a unified service processing function getMatchedAnswer is set. All function modules must implement the function getMatchedAnswer and rely on an output function of the function. The unified form and a flexible loading configuration are achieved.

By way of example, the description of getMatchedAnswer is as follows:

ChatRecord getMatchedAnswer(ChatRecord questionRecord, UserProfile userProfile, List<ChatRecord> chatHistoryRecords) throws ChatBotException;

In operation 206b, the response information for the dialogue interaction information is generated by the chatbot calling the service processing functions.

Further, in addition to the foregoing method flow, the method for generating a chatbot described in an embodiment of the present disclosure may further include the following operations.

In operation 207, the dialogue interaction information, the response information, and the interaction time associated with the dialogue interaction information are obtained.

In operation 208, the dialogue interaction information, the response information, and the interaction time are stored into a preset storage area based on a preset data storage structure.

In an embodiment of the present disclosure, the data storage structure is preset. The preset data storage structure serves as a data stream transmission carrier, and runs through an entire engineering response period, that is, an entire robot generation process and a subsequent maintenance process.

In an embodiment of the present disclosure, the preset data storage structure can elastically add variables and delete variables according to requirements, improve compatibility of engineering modules, and decouple data from functions.

In an embodiment of the present disclosure, the name of the preset data storage structure may be set as chatRecord. The chatRecord may store all useful information, for example, the dialogue interaction information such as a user question, the interaction time such as query time, and the response information such as response information generated by the platform. A call maintenance of the chatRecord runs through an entire response flow of a project and is one of necessary parameters for a performance functions of all the function modules.

In operation 209, at least one piece of second dialogue logic information input by the user for the chatbot is received.

In operation 210, the at least one first function module is updated based on the at least one piece of first dialogue logic information, the at least one piece of second dialogue logic information, and content stored in the storage area, to obtain at least one third function module.

In operation 211, the chatbot is updated based on the at least one third function module through the preset model container.

In an embodiment of the present disclosure, a visualized platform for managing a chatbot is established by using the jinx technology of java. In this way, the user can add, modify, delete data and dialogue logic in the platform based on the platform for managing a chatbot, so as to achieve the purpose of customizing personalized chatbot without modifying overall engineering codes, and achieve complete decoupling and online real-time updating.

As can be seen from the above, the method for generating a chatbot provided in an embodiment of the present disclosure realizes configurability of dialogue logic. Different first-level service processing logics are set according to different service robots, and a corresponding function module is called according to a corresponding logic order to perform service processing. It is achieved that different personalized robots is quickly generated and a bottom module is reused. At the same time, a configurable model container is also achieved. The model container uniformly loads all function modules. All engineering processes call the model through the model container. A function extension and a later function maintenance control the function modules through the model container.

It is to be noted that the platform for managing a chatbot provided in the present disclosure not only supports customer service response requirements of a service department, but also uses an underlying data sharing mechanism, thereby enriching a selectable range for response of different departments and reducing a cost for manually sorting corpus. The experiment proves that the user satisfactions reaches 81%. Besides, the average time for the platform for managing a chatbot provided herein to configure a new personalized chatbot is approximately three days, greatly reducing the workload of a research and development personnel.

As can be seen from the above, the method for generating a chatbot provided in an embodiment of the present disclosure quickly generates the personalized robot, provides a new robot with a data service by using basic data of other robots in the platform for managing a chatbot, and makes maintenance at a later state simple. All maintenance may be made by configuring and editing processing logic and basic data in the platform for managing a chatbot through a third-party platform without affecting the operation of the platform for managing a chatbot. At the same time, it is achieved that the dialogue logic is configurable, different first-level service processing logics are set according to different service robots, and a corresponding first function module is called according to a corresponding logic order to perform service processing. It is achieved that different personalized robots are quickly generated and a bottom module is reused. A configurable model container is achieved. The model container uniformly loads all first function modules. All engineering processes call the model through the model container. A function extension and a later function maintenance control the first function module through the model container. It is achieved that the data sharing is thoroughly performed from the bottom layer data and function modules, and the function reuse, flexible configuration, and easy maintenance are realized, so that the cost is reduced, the copying is fast, and new personalized chatbot are generated in batches.

It is to be noted that for the description regarding the same operations and contents in this embodiment as those in other embodiments, reference may be made to the description in the other embodiments, and details will not be described herein repeatedly.

Figure 6:
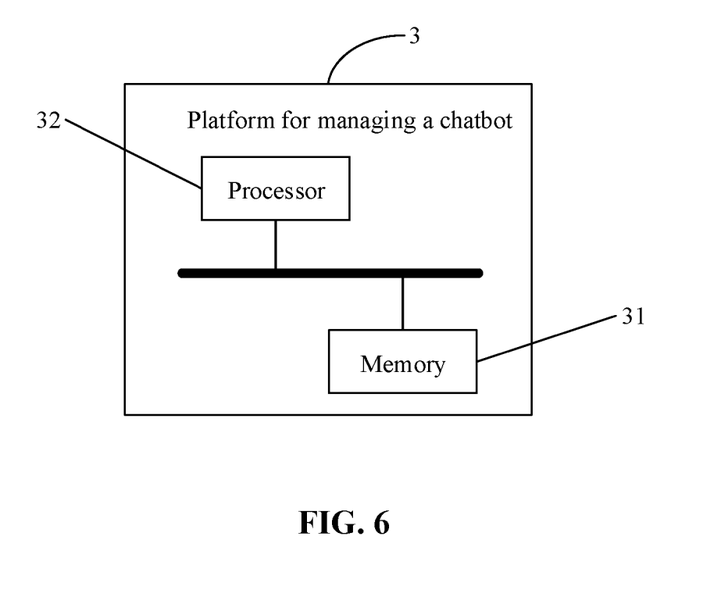
FIG. 6 is a schematic structural diagram of a platform for managing a chatbot according to an embodiment of the present disclosure.

Based on the foregoing embodiment, an embodiment of the present disclosure provides a platform for managing a chatbot, which can be applied to the method for generating a chatbot provided in the embodiment corresponding to FIGS. 1-2. Referring to FIG. 6, the platform 3 for managing a chatbot includes a memory 31 for storing executable instructions;

a processor 32 for executing the executable instructions stored in the memory 31 to implement the following operations:

obtaining at least one first function module associated with a chatbot to be generated;

obtaining a calling order of the at least one first function module; and generating the chatbot by calling the at least one first function module based on the calling order through a preset model container.

In an embodiment of the present disclosure, the processor 32 is configured to execute the executable instructions stored in the memory 31 to implement the following operations:

obtaining at least one piece of first dialogue logic information associated with the chatbot to be generated; and determining the at least one first function module associated with the at least one piece of first dialogue logic information.

In an embodiment of the present disclosure, the processor 32 is configured to execute the executable instructions stored in the memory 31 to implement the following operations:

obtaining attribute information of all first function modules in a preset first function module set, wherein the attribute information includes at least description information of a function of the first function module;

selecting at least one piece of target attribute information matching the at least one piece of first dialogue logic information from the attribute information of the all first function modules: and selecting the at least one first function module having the at least one piece of target attribute information from the preset first function module set.

In an embodiment of the present disclosure, the processor 32 is configured to execute the executable instructions stored in the memory 31 to implement the following operations:

selecting at least one second function module having the at least one piece of target attribute information from the preset first function module set;

obtaining service processing logic of each second function module of the at least one second function module; and determining the at least one first function module from the at least one second function module based on the at least one piece of first dialogue logic information and the at least one service processing logic.

In an embodiment of the present disclosure, the processor 32 is configured to execute the executable instructions stored in the memory 31 to implement the following operations:

obtaining dialogue interaction information input by a user; and generating response information for the dialogue interaction information by the chatbot.

In an embodiment of the present disclosure, the processor 32 is configured to execute the executable instructions stored in the memory 31 to implement the following operations:

setting service processing functions corresponding to the all first function modules in the preset first function module set; and generating the response information for the dialogue interaction information by the chatbot calling the service processing functions.

In an embodiment of the present disclosure, the processor 32 is configured to execute the executable instructions stored in the memory 31 to implement the following operations:

obtaining the dialogue interaction information, the response information, and interaction tune associated with the dialogue interaction information; and storing the dialog interaction information, the response information, and the interaction time into a preset storage area.

In an embodiment of the present disclosure, the processor 32 is configured to execute the executable instructions stored in the memory 31 to implement the following operations:

receiving at least one piece of second dialogue logic information input by the user for the chatbot;

updating the at least one first function module based on the at least one piece of first dialogue logic information, the at least one piece of second dialogue logic information, and content stored in the storage area, to obtain at least one third function module; and updating the chatbot based on the at least one third function module through the preset model container.

The platform for managing a chatbot provided in an embodiment of the present disclosure obtains at least one first function module associated with a chatbot to be generated; obtains a calling order of the at least one first function module; generates the chatbot by calling the at least one first function module based on the calling order through a preset model container. The method solves the problem that in the related art, a chatbot that meets the personalized requirements of different business parties cannot be quickly generated in a short time is solved, thereby generating a personalized chatbot quickly.

It is to be noted that, the specific implementation process of the operations executed by the processor in this embodiment may be referred to the implementation process in the method for generating a chatbot provided in the corresponding embodiment of FIGS. 1-2, and details are not described herein.

Based on the foregoing embodiments, embodiments of the present disclosure provide a computer-readable storage medium storing one or more programs, wherein when executed by one or more processors, the one or more programs implement the following operations:

obtaining at least one first function module associated with a chatbot to be generated;

obtaining a calling order of the a least one first function module; and generating the chatbot by calling the at least one first function module based on the calling order through a preset model container.

In other embodiments of the present disclosure, when executed by one or more processors, the one or more programs implement the following operations:

obtaining at least one piece of first dialogue logic information associated with the chatbot to be generated; and determining the at least one first function module associated with the at least one piece of first dialogue logic information.

In other embodiments of the present disclosure, when executed by one or more processors, the one or more programs implement the following operations;

obtaining attribute information of all first function modules in a preset first function module set, wherein the attribute information includes at least description information of a function of the first function modules;

selecting at least one piece of target attribute information matching the at least one piece of first dialogue logic information from the attribute information of the all first function modules; and selecting the at least one first function module having the at least one piece of target attribute information from the preset first function module set.

In other embodiments of the present disclosure, when executed by one or more processors, the one or more programs implement the following operations:

selecting at least one second function module having the at least one piece of target attribute information from the preset first function module set;

obtaining service processing logic of each second function module of the at least one second function module; and determining the at least one first function module from the at least one second function module based on the at least one piece of first dialogue logic information and the at least one service processing logic.

In other embodiments of the present disclosure, when executed by one or more processors, the one or more programs implement the following operations:

obtaining dialogue interaction information input by a user; and generating response information for the dialogue interaction information by the chatbot.

In other embodiments of the present disclosure, when executed by one or more processors, the one or more programs implement the following operations:

setting service processing functions corresponding to the all first function modules in the preset first function module set; and generating the response information for the dialogue interaction information by the chatbot calling the service processing functions.

In other embodiments of the present disclosure, when executed by one or more processors, the one or more programs implement the following operations:

obtaining the dialogue interaction information, the response information, and interaction time associated with the dialogue interaction information; and storing the dialogue interaction information the response information, and the interaction time into a preset storage area based on a preset data storage structure.

In other embodiments of the present disclosure, when executed by one or more processors, the one or more programs implement the following operations:

receiving at least one piece of second dialogue logic information input by the user for the chatbot;

updating the at least one first function module based on the at least one piece of first dialogue logic information, the at least one piece of second dialogue logic information, and content stored in the storage area, to obtain at least one third function module; and updating the chatbot based on the at least one third function module through the preset model container.

The storage medium provided in an embodiment of the present disclosure obtains at least one first function module associated with a chatbot to be generated; obtains a calling order of the at least one first function module; generates the chatbot by calling the at least one first function module based on the calling order through a preset model container. The method solves the problem that in the related art, a chatbot that meets the personalized requirements of different business parties cannot be quickly generated in a short time is solved, thereby realizing generating a personalized chatbot quickly.

It is to be noted that, the specific implementation process of the operations executed by the processor in this embodiment may be referred to the implementation process in the method for generating a chatbot provided in the corresponding embodiment of FIGS. 1-2, and details are not described herein.

The foregoing is merely an embodiment of the present disclosure, and is not intended to limit the scope of protection of the present disclosure. Any modifications, equivalent replacements, and improvements made within the spirit and scope of the present disclosure are included within the scope of the present disclosure.

INDUSTRIAL PRACTICALITY

Embodiments of the present disclosure provide a chatbot generating method, a platform for managing a chatbot, and storage medium. The chatbot generating method includes: obtaining at least one first function module associated with a chatbot to be generated; obtaining a calling order of at least one first function module calling at least one first function module based on the calling order through a preset model container, generating a pairwise speech robot. In the related art, the problem that the chatbot that meets the personalized requirements of different business parties cannot be quickly generated in a short time is solved, and the chatbot that quickly generates the personalized chatbot is realized.

The invention claimed is:

1. A method for generating a chatbot applied to a platform for managing a chatbot, comprising:

obtaining at least one first function module associated with the chatbot to be generated;

obtaining a calling order of the at least one first function module; and generating the chatbot by calling the at least one first function module based on the calling order through a preset model container, wherein different chatbots are generated by calling the at least one first function module based on different calling orders;

wherein obtaining the at least one first function module associated with the chatbot to be generated comprises:

obtaining at least one piece of first dialogue logic information associated with the chatbot to be generated; and determining the at least one first function module associated with the at least one first dialogue logic information;

wherein the at least one piece of first dialogue logic information represents a requirement of a user for personalized chat of the chatbot to be generated;

wherein determining the at least one first function module associated with the at least one piece of first dialogue logic information comprises:

obtaining attribute information of all first function modules in a preset first function module set, wherein the attribute information comprises at least description information of a function of the first function modules;

selecting at least one piece of target attribute information matching the at least one piece of first dialogue logic information from the attribute information of the all first function modules; and selecting the at least one first function module having the at least one piece of target attribute information from the preset first function module set.

2. The method of claim 1, wherein selecting the at least one first function module having the at least one piece of target attribute information from the preset first function module set comprises:

selecting at least one second function module having the at least one piece of target attribute information from the preset first function module set;

obtaining service processing logic of each second function module of the at least one second function module; and determining the at least one first function module from the at least one second function module based on the at least one piece of first dialogue logic information and the at least one service processing logic.

3. The method of claim 1, wherein after generating the chatbot by calling the at least one first function module based on the calling order through the preset model container, the method further comprises:

obtaining dialogue interaction information input by the user; and generating response information for the dialogue interaction information by the chatbot.

4. The method of claim 3, wherein generating the response information for the dialogue interaction information by the chatbot comprises:

setting service processing functions corresponding to the all first function modules in the preset first function module set; and generating the response information for the dialogue interaction information by the chatbot calling the service processing functions.

5. The method of claim 4, further comprising:

obtaining the dialogue interaction information, the response information, and interaction time associated with the dialogue interaction information; and storing the dialogue interaction information, the response information, and the interaction time into a preset storage area based on a preset data storage structure.

6. The method of claim 5, further comprising:
receiving at least one piece of second dialogue logic information input by the user for the chatbot;
updating the at least one first function module based on the at least one piece of first dialogue logic information, the at least one piece of second dialogue logic information, and content stored in the storage area, to obtain at least one third function module; and
updating the chatbot based on the at least one third function module through the preset model container.

7. The method of claim 1, wherein a unified service processing function is set for all of the at least one first function module, wherein the unified service processing function is used to perform an output function.

8. A platform for managing a chatbot, comprising:
a memory for storing executable instructions;
a processor for executing the executable instructions stored in the memory to perform operations of:
obtaining at least one first function module associated with the chatbot to be generated;
obtaining a calling order of the at least one first function module; and
generating the chatbot by calling the at least one first function module based on the calling order through a preset model container, wherein different chatbots are generated by calling the at least one first function module based on different calling orders;
wherein obtaining the at least one first function module associated with the chatbot to be generated comprises:
obtaining at least one piece of first dialogue logic information associated with the chatbot to be generated; and
determining the at least one first function module associated with the at least one first dialogue logic information;
wherein the at least one piece of first dialogue logic information represents a requirement of a user for personalized chat of the chatbot to be generated;
wherein determining the at least one first function module associated with the at least one piece of first dialogue logic information comprises:
obtaining attribute information of all first function modules in a preset first function module set, wherein the attribute information comprises at least description information of a function of the first function modules;
selecting at least one piece of target attribute information matching the at least one piece of first dialogue logic information from the attribute information of the all first function modules; and
selecting the at least one first function module having the at least one piece of target attribute information from the preset first function module set.

9. The platform of claim 8, wherein selecting the at least one first function module having the at least one piece of target attribute information from the preset first function module set comprises:
selecting at least one second function module having the at least one piece of target attribute information from the preset first function module set;
obtaining service processing logic of each second function module of the at least one second function module; and
determining the at least one first function module from the at least one second function module based on the at least one piece of first dialogue logic information and the at least one service processing logic.

10. The platform of claim 8, wherein the processor is further configured to execute the instructions to perform operations of:
after generating the chatbot by calling the at least one first function module based on the calling order through the preset model container, obtaining dialogue interaction information input by the user; and
generating response information for the dialogue interaction information by the chatbot.

11. The platform of claim 10, wherein generating the response information for the dialogue interaction information by the chatbot comprises:
setting service processing functions corresponding to the all first function modules in the preset first function module set; and
generating the response information for the dialogue interaction information by the chatbot calling the service processing functions.

12. The platform of claim 11, wherein the processor is further configured to execute the instructions to perform operations of:
obtaining the dialogue interaction information, the response information, and interaction time associated with the dialogue interaction information; and
storing the dialogue interaction information, the response information, and the interaction time into a preset storage area based on a preset data storage structure.

13. The platform of claim 12, wherein the processor is further configured to execute the instructions to perform operations of:
receiving at least one piece of second dialogue logic information input by the user for the chatbot;
updating the at least one first function module based on the at least one piece of first dialogue logic information, the at least one piece of second dialogue logic information, and content stored in the storage area, to obtain at least one third function module; and
updating the chatbot based on the at least one third function module through the preset model container.

14. The platform of claim 8, wherein a unified service processing function is set for all of the at least one first function module, wherein the unified service processing function is used to perform an output function.

15. A non-transitory storage medium having stored executable instructions that when executed, cause a processor to perform a method for generating a chatbot applied to a platform for managing a chatbot, the method comprising:
obtaining at least one first function module associated with a chatbot to be generated;
obtaining a calling order of the at least one first function module; and
generating the chatbot by calling the at least one first function module based on the calling order through a preset model container, wherein different chatbots are generated by calling the at least one first function module based on different calling orders;
wherein obtaining the at least one first function module associated with the chatbot to be generated comprises:
obtaining at least one piece of first dialogue logic information associated with the chatbot to be generated; and
determining the at least one first function module associated with the at least one first dialogue logic information;
wherein the at least one piece of first dialogue logic information represents a requirement of a user for personalized chat of the chatbot to be generated;

wherein determining the at least one first function module associated with the at least one piece of first dialogue logic information comprises:
    obtaining attribute information of all first function modules in a preset first function module set, wherein the attribute information comprises at least description information of a function of the first function modules;
    selecting at least one piece of target attribute information matching the at least one piece of first dialogue logic information from the attribute information of the all first function modules; and
    selecting the at least one first function module having the at least one piece of target attribute information from the preset first function module set.

16. The non-transitory storage medium of claim 15, wherein selecting the at least one first function module having the at least one piece of target attribute information from the preset first function module set comprises:
    selecting at least one second function module having the at least one piece of target attribute information from the preset first function module set;
    obtaining service processing logic of each second function module of the at least one second function module; and
    determining the at least one first function module from the at least one second function module based on the at least one piece of first dialogue logic information and the at least one service processing logic.

17. The non-transitory storage medium of claim 15, wherein a unified service processing function is set for all of the at least one first function module, wherein the unified service processing function is used to perform an output function.

* * * * *